United States Patent Office 2,819,090
Patented Jan. 7, 1958

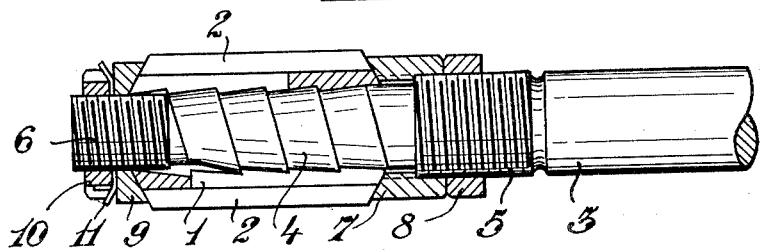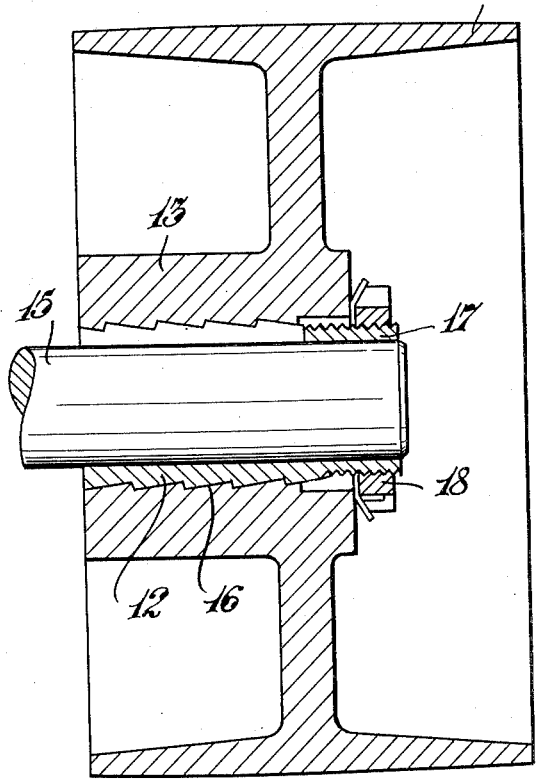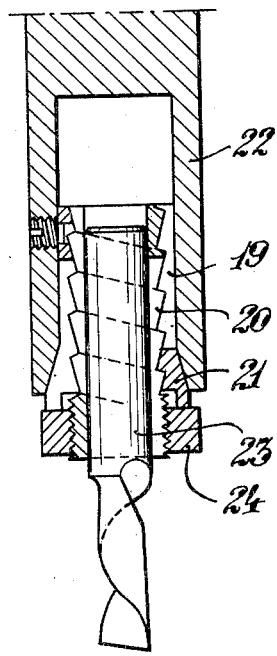

2,819,090

GRIPPING DEVICE

Sigfrid Linus Stenberg, Nassjo, Sweden

Application November 9, 1953, Serial No. 391,028

Claims priority, application Sweden November 11, 1952

2 Claims. (Cl. 279—2)

The present invention relates to a gripping device including an expansible collet which permits a uniform or substantially uniform expansion, or contraction, along the entire length of said collet while securing a uniform strength as well as a substantially uniform design of the collet along its entire length.

A feature of the invention involves an expansible collet, which, in a manner known per se, is slit from one or both ends, is formed with internal, or external, conical surfaces uniformly distributed in the longitudinal direction of the collet which are adapted to engage corresponding surfaces of a member inserted in the collet or surrounding the collet so that a displacement of the collet and said member with relation to each other results in an expansion, or contraction, of the collet for effecting a gripping action or releasing such an action.

According to another feature of the invention the said surfaces are represented by an internal, or external, thread having a great pitch as compared with the depth of thread.

In the accompanying drawing three embodiments of the invention are illustrated.

Fig. 1 is a longitudinal section of an adjustable reamer to which the invention is applied. Fig. 2 is an axial section of a pulley clamped to its shaft by means of a gripping device according to the invention. Fig. 3 is a longitudinal section of a chuck comprising a double acting embodiment of the invention.

With reference to Fig. 1, the numeral 1 indicates an expansible collet slit from both ends. 2 are a pair of reaming cutters, and 3 is a mandrel forming the supporting element of the reamer. The expansible collet is formed with an internal thread having a great pitch and a small depth of thread. Externally the collet is bounded by a smooth cylindrical surface along which the reaming cutters are provided. Both ends of the collet and the reaming cutters are conically tapered. The mandrel 3 is formed with an external thread 4 corresponding to that of the collet and shown in complete engagement therewith. On opposite ends of the thread 4 the mandrel is formed with usually screw-threaded portions 5 and 6. The screw-threaded portion 5 carries adjacent the respective end of the collet and cutters an adjusting nut 7 formed with a conical recess engaged by the tapered end of the collet and cutters. Bearing against the opposite side of the adjusting nut is a locking nut 8. The threaded portion 6 representing the free end of the mandrel carries loosely adjacent the respective end of the collet an internally smooth ring 9 which is conically recessed for engagement with the tapered end of the collet and cutters and outside said washer an adjusting nut 10 with associated locking washer 11.

In the position shown the reamer has its smallest diameter.

To adjust the reamer in order to increase its diameter the locking nut 8 and the adjusting nut 7 are loosened whereupon the upwardly bent locking flap of the washer 11 is released and the adjusting nut 10 tightened. This manipulation effects an axial movement of the collet 1 to the right in the drawing with a resulting expansion thereof because of its thread being displaced towards the wider end of the thread 4 of the mandrel. When the desired diameter of the reamer is obtained the nuts 7 and 8 are tightened and the locking flap of the washer 11 is again restored to locking position.

Since the expansible collet 1 is formed with conical surfaces as represented by its internal thread, and said surfaces are uniformly distributed along the entire length of the collet, the expansion of the collet will be equal along the entire length of the collet which would not be the case if the expanding sleeve were provided with a single conical surface extending along a fraction only of the length of the collet. In order to obtain a uniform expansion with the aid of a single conical surface, said surface had to extend along the entire length of the collet with the result that the strength of the collet would be considerably different at opposite ends of the sleeve. In both of said last-mentioned cases the collet and the mandrel will, in addition, be unsymmetrical and consequently less suitable from manufacturing point of view.

In Fig. 2 is shown an expansible collet 12 formed with an external thread used for clamping the hub 13 of a pulley 14 to a shaft 15. In this case the collet as well as the hub are formed substantially along their entire length each with a thread having a small depth of thread and a great pitch, as shown at 16. At one end the collet is provided with an extension 17 having a usual screw-thread for supporting a nut 18 bearing against the respective end of the hub 13 via a locking washer. A tightening of the nut 18 will displace the collet 12 to the right in the drawing, thereby drawing the thread of the hub towards the wider end of the thread of the collet.

The chuck shown in Fig. 3 includes a double acting gripping device according to the invention. Said gripping device comprises an outer collet 19 having an internal thread of small depth and great pitch and an inner collet 20 having an external thread of small depth and great pitch in mesh with the thread of the outer collet. The peripheral surface of the outer collet is smooth and cylindrical to the main portion of its length for engaging a cylindrical boring in a chuck spindle 22 and conically widened at the outer end of the collet, as shown at 21, for engaging a correspondingly widened end portion of the boring in the spindle 22. The inner collet is cylindrical or slightly conical internally along its entire length for gripping around the cylindrical or slightly conical shank 23 of the tool, such as, for example, a twist drill. The outer end portion of the inner collet is provided with usual screw-thread for receiving a nut 24 bearing against the enlarged end portion 21 of the outer collet 19.

It is to be noted that the above description and the drawings only relate to examples of the invention but have not for their object to limit the use of the invention.

Though the threads of the collets and the elements in engagement therewith may be replaced by proper conical surfaces, it is preferred to use threads from manufacturing point of view.

What I claim is:

1. A gripping device comprising in combination, an expansible collet having a thread formed of an endless helical conical surface of an axial length much greater than the radial extent of said surface, and a substantially radial helical surface which meets the said conical surface in a sharp edge forming an endless winding, a member coaxially arranged with respect to said collet, said member having a thread corresponding to that of the collet for allowing axial adjustment of said collet and said member with relation to each other by a relative rotation thereof, one of said coengaging elements being formed with a screw-threaded end portion for receiving a nut, by means of which the collet and said member in engagement therewith can be displaced axially with relation to each other while holding them against relative rotation with a view to changing the expansion of the collet for locking, or releasing, said elements with respect to each other.

2. An adjustable reamer comprising in combination, a mandrel having a thread the pitch of which is great as compared with the depth of thread and screw-threaded portions on opposite ends of said thread, an expansible collet surrounding said thread and having a corresponding internal thread for allowing axial adjustment of said collet and said member with relation to each other by a relative rotation thereof, reaming cutters axially mounted on the outer surface of the collet, the collet and said cutters being formed with conically tapered ends, an adjusting nut having a correspondingly conical recess on one of said screw-threaded portions for engaging the respective tapered end of the collet and the cutters for holding said collet and cutters against relative rotation, a locking nut on said screw-threaded portion for cooperation with said adjusting nut, a ring freely mounted on the other screw-threaded portion of the mandrel, said ring having a conical recess for engagement with the respective conical end of the collet and the cutters, an adjusting nut on said screw-threaded portions outside said ring, and a locking washer between said ring and said adjusting nut for arresting the latter in position.

References Cited in the file of this patent

UNITED STATES PATENTS

| | | |
|---|---|---|
| 342,218 | Miller | May 18, 1886 |
| 670,533 | Byrd | Mar. 26, 1901 |
| 890,394 | Ahrens | June 9, 1908 |
| 1,056,480 | Wood | Mar. 18, 1913 |
| 1,392,798 | Rice | Oct. 4, 1921 |
| 1,464,551 | Urquhart | Aug. 14, 1923 |
| 1,528,353 | Waterman | Mar. 3, 1925 |
| 1,873,515 | Warren | Aug. 23, 1932 |
| 2,383,036 | Benjamin et al. | Aug. 21, 1945 |

OTHER REFERENCES

"American Machinist," Dec. 8, 1921, pp. 916, 7.